Patented Dec. 29, 1936

2,066,105

UNITED STATES PATENT OFFICE 2,066,105

MEDICAMENTS COATED WITH A WATER-INSOLUBLE POLYMERIZATION PRODUCT AND PROCESS OF PREPARING THEM

Max Hagedorn, Dessau in Anhalt, and Max Bockmühl and Günther Gorr, Frankfort-on-the-Main, Germany, assignors to Winthrop Chemical Company, Inc., New York, N. Y., a corporation of New York No Drawing. Application November 20, 1933, Serial No. 698,938. In Germany November 23, 1932

10 Claims. (Cl. 167—65)

The present invention relates to medicaments coated with a water-insoluble polymerization product and process of preparing them.

In medicine there exists a series of cases in which medicaments administered per os are to enter the intestine without previously coming into contact with the wall of the stomach or the contents of the stomach, for instance ferment and enzyme preparations administered per os which do not resist the action of the acid juices and the enzymes of the stomach. Therefore, therapeutical substances have already been provided with coatings which dissolve only in the intestine.

Now we have found that therapeutical substances may be protected very readily and reliably against the action of the stomach-contents by coating or enclosing them with or in a film consisting of a water-insoluble polymerizate containing acid groups. The coatings thus provided are not affected by the acid stomach-contents but dissolve in the intestine in which there is alkaline reaction. At the same time the film protects the therapeutical substances against atmospheric influences.

As polymerizates which contain acid groups there may, for instance, be used polymerized acids, such as polystyrene maleic acid, polyacrylic acid or the like, furthermore products which are obtainable by polymerization of mixtures of substances and contain an acid component. Of course, there may also be used the derivatives of these acids, which may easily be hydrolyzed in the alkaline intestine such as the esters of said acids.

The film coatings may be prepared in a simple manner by moistening the medicaments, powders, pills, tablets, dredges or the like to be coated with a solution of the film-forming substances in suitable solvents, such as alcohol, acetone, ethyl acetate or the like and by evaporating the adhering solvent. The evaporation of the solvents may, of course, be carried out under reduced pressure or also at a raised temperature or both. In the said manner several layers of the film-forming substances may be applied successively. The medicaments may also be surrounded by a capsule prepared from an acid, water-insoluble polymerizate. In case there are to be combined in one and the same medicament substances which do not resist the action of the acid juices of the stomach but are required to be effective in the intestine with substances which are effective in the stomach the latter substances are carried on a nucleus formed of a pill or tablet which is protected in the manner above described and contains the substances which do not resist the action of the stomach juices.

The stability to water of all films and coatings to be produced according to this invention may be increased by adding to the solution of the film-forming substance water-repellent substances, such as esters, ethers not substantially volatile at room temperature, hydrocarbons, also anhydrides of the higher fatty acids or the like, in so far as these bodies are physiologically inactive.

The following examples illustrates the invention:

(1) From a solution of the product obtainable by polymerizing a mixture of vinylbutylether and maleic anhydride a film is formed in known manner which may be used for enveloping the medicaments. The solution may also serve for directly coating the medicaments or the like, in case they do not dissolve in the solvent employed.

The solution may be prepared in the following manner: The above polymerizate from vinylbutylether and maleic anhydride (1:1) is dissolved in an aqueous caustic soda N-solution, while stirring. By addition of acetic acid to the filtered solution, the free acid is precipitated in the form of a white insoluble precipitate. After thoroughly washing it with distilled water, the free acid is dried and then dissolved in methanol or acetone or a mixture of both so as to yield an about 5 per cent. solution.

(2) From a 5 to 10 per cent. solution of the product obtainable by polymerizing a mixture of acrylic acid nitrile and acrylic acid methylester in a mixture of acetone and methanol (6:1) to which solution has been added the fatty acids of coconut oil amounting to 5 per cent. of the weight of the solid in solution, a film of 80 to 100 $\mu$ thickness is prepared. This is used for the same purpose as indicated in Example 1. This film is insoluble in normal/100 hydrochloric acid, soluble in a 2 per cent. sodium carbonate solution.

The parent material may be prepared as follows: 50 grams of the product obtainable by polymerizing a mixture of 10 parts of acrylic acid nitrile and 90 parts of acrylic acid methylester are dissolved in 950 cc. of acetone and there are added thereto 270 cc. of 2N-solution of potassium hydroxide in methanol and 500 cc. of acetone. After 7 minutes the liquid becomes turbid; after 9 minutes the precipitation of the potassium salt of the polymerizate which has been saponified in the ester group is finished. The free acid is prepared from the salt with the aid of acetic acid and is thoroughly washed and then dried.

(3) For surrounding the therapeutical substances there is used as described in Example 1 a polymerization product which may be prepared in the following way:

100 grams of a polymerizate obtainable from a mixture of 90 parts of acrylic acid butylester and 10 parts of styrene are made to swell in 2 liters of acetone and 200 cc. of $CH_3OH$ and the whole is then heated for ¾ hour at 50° C. with half a liter of 2N-solution of potassium hydroxide in methanol. The ester group is saponified thereby; the potassium salt which is precipitated is dissolved in water and converted by means of aqueous acetic acid into the free acid. This acid is dissolved in acetone or methanol and a film is formed therefrom which is insoluble in water, but soluble in a very feebly alkaline medium.

(4) The product obtainable by polymerizing a mixture of styrene and maleic anhydride is dissolved in a suitable organic solvent, such as acetone and thoroughly mixed with a preparation of pancreas enzymes. After evaporation of the solvent there is obtained a stable product, capable of passing the stomach in an unaffected manner and of dissolving in the intestine.

We claim:

1. The process which comprises coating medicaments with a film-forming water-insoluble organic polymerization product containing a radical selected from the group consisting of

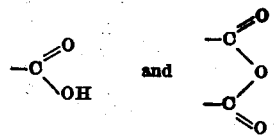

2. The process which comprises coating medicaments with a water-insoluble product obtainable by polymerizing a mixture of styrene and maleic anhydride.

3. The process which comprises coating enzymes with a film-forming water-insoluble organic polymerization product containing a radical selected from the group consisting of

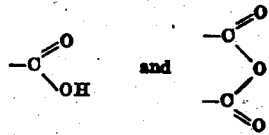

4. The process which comprises coating enzymes with a water-insoluble product obtainable by polymerizing a mixture of styrene and maleic anhydride.

5. The process which comprises coating pancreas enzymes with a water-insoluble product obtainable by polymerizing a mixture of styrene and maleic anhydride.

6. A composition of matter comprising a medicament coated with a film-forming water-insoluble organic polymerization product containing a radical selected from the group consisting of

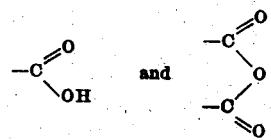

7. A composition of matter comprising a medicament coated with a water-insoluble product obtainable by polymerizing a mixture of styrene and maleic anhydride.

8. A composition of matter comprising enzymes coated with a film-forming water-insoluble organic polymerization product containing a radical selected from the group consisting of

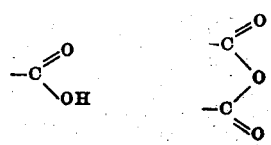

9. A composition of matter comprising enzymes coated with a water-insoluble product obtainable by polymerizing a mixture of styrene and maleic anhydride.

10. A composition of matter comprising pancreas enzymes coated with a water-insoluble product obtainable by polymerizing a mixture of styrene and maleic anhydride.

MAX HAGEDORN.
MAX BOCKMÜHL.
GÜNTHER GORR.